(12) United States Patent
Chuong et al.

(10) Patent No.: US 10,830,081 B2
(45) Date of Patent: Nov. 10, 2020

(54) NON-CONTACT SEAL WITH NON-STRAIGHT SPRING BEAM(S)

(71) Applicant: United Technologies Corporation, Farmington, CT (US)

(72) Inventors: Conway Chuong, Manchester, CT (US); Tara L. D'Ambruoso, Oxford, CT (US); Dwayne K. Mecklenburg, Stafford Springs, CT (US); Peter E. Gunderson, West Hartford, CT (US); Eric D. Gray, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 643 days.

(21) Appl. No.: 15/651,261

(22) Filed: Jul. 17, 2017

(65) Prior Publication Data
US 2019/0017403 A1 Jan. 17, 2019

(51) Int. Cl.
*F01D 11/02* (2006.01)
*F16J 15/44* (2006.01)

(52) U.S. Cl.
CPC ........... *F01D 11/025* (2013.01); *F16J 15/442* (2013.01); *F05D 2220/32* (2013.01); *F05D 2240/60* (2013.01); *F05D 2260/38* (2013.01)

(58) Field of Classification Search
CPC ................... F01D 11/025; F01D 11/01; F01D 11/003–025; F16J 15/442; F16J 15/44; F05D 2260/38; F05D 2220/32; F05D 2240/60
USPC ......... 415/170.1, 171.1, 173.1–173.3, 174.1, 415/174.2
See application file for complete search history.

(56) References Cited

U.S. PATENT DOCUMENTS

| | | | |
|---|---|---|---|
| 6,226,975 B1 | 5/2001 | Ingistov |
| 6,428,009 B2 | 8/2002 | Justak |
| 7,182,345 B2 | 2/2007 | Justak |
| 7,410,173 B2 | 8/2008 | Justak |
| 7,896,352 B2 | 3/2011 | Justak |
| 8,002,285 B2 | 8/2011 | Justak |
| 8,100,403 B2 | 1/2012 | Short |
| 8,172,232 B2 | 5/2012 | Justak |

(Continued)

FOREIGN PATENT DOCUMENTS

WO 2008140451 A1 11/2008

OTHER PUBLICATIONS

Office action for 18172479.0 dated Dec. 10, 2019.
EP search report for EP18172479.0 dated Nov. 6, 2018.

*Primary Examiner* — Carl C Staubach
*Assistant Examiner* — Robert A Werner
(74) *Attorney, Agent, or Firm* — Getz Balich LLC (57) ABSTRACT

An assembly includes a plurality of seal shoes, a seal base and a plurality of spring elements. The seal shoes are arranged around an axis in an annular array. The seal base circumscribes the annular array of the seal shoes. Each of the spring elements is radially between and connects a respective one of the seal shoes to the seal base. A first of the spring elements includes a first mount, a second mount and a spring beam. The first mount is connected to the first seal shoe. The second mount is connected to the seal base and disposed a circumferential distance away from the first mount. The spring beam extends longitudinally along a non-straight centerline between and connected to the first mount and the second mount.

20 Claims, 8 Drawing Sheets

(56) References Cited

U.S. PATENT DOCUMENTS

| | | | |
|---|---|---|---|
| 8,628,092 B2* | 1/2014 | Deo | F01D 11/12 |
| | | | 277/412 |
| 9,587,746 B2 | 3/2017 | Bidkar et al. | |
| 2004/0217549 A1* | 11/2004 | Justak | F16J 15/3288 |
| | | | 277/355 |
| 2007/0296159 A1 | 12/2007 | Feeny | |
| 2008/0100000 A1* | 5/2008 | Justak | F16J 15/442 |
| | | | 277/355 |
| 2008/0246223 A1* | 10/2008 | Justak | F01D 11/02 |
| | | | 277/411 |
| 2008/0265513 A1* | 10/2008 | Justak | F16J 15/442 |
| | | | 277/301 |
| 2010/0239415 A1 | 9/2010 | Turnquist | |
| 2011/0121519 A1* | 5/2011 | Justak | F16J 15/442 |
| | | | 277/412 |
| 2013/0234399 A1* | 9/2013 | Justak | F01D 11/025 |
| | | | 277/411 |
| 2014/0119912 A1 | 5/2014 | Bidkar | |
| 2015/0285152 A1* | 10/2015 | Hayford | F02C 7/28 |
| | | | 415/171.1 |
| 2015/0322816 A1* | 11/2015 | Schmitz | F01D 1/04 |
| | | | 60/796 |
| 2016/0102570 A1* | 4/2016 | Wilson | F16F 15/06 |
| | | | 277/411 |
| 2016/0130963 A1* | 5/2016 | Wilson | F01D 11/001 |
| | | | 60/805 |
| 2016/0334020 A1 | 11/2016 | Ozaki et al. | |
| 2016/0376904 A1* | 12/2016 | Schwarz | F01D 11/02 |
| | | | 415/230 |
| 2017/0009596 A1* | 1/2017 | Schwarz | F01D 11/08 |
| 2017/0044918 A1* | 2/2017 | McCaffrey | F01D 11/02 |
| 2017/0051621 A1* | 2/2017 | Ackermann | F01D 5/087 |
| 2017/0051631 A1* | 2/2017 | Ackermann | F01D 5/02 |
| 2017/0051751 A1* | 2/2017 | Ackermann | F01D 5/06 |
| 2017/0130732 A1* | 5/2017 | Schwarz | F01D 11/001 |
| 2017/0211402 A1 | 7/2017 | Peters | |
| 2017/0248236 A1* | 8/2017 | Simpson | F16J 15/447 |
| 2018/0045067 A1* | 2/2018 | Chuong | F01D 25/24 |
| 2018/0363563 A1 | 12/2018 | Gunderson | |

* cited by examiner

NON-CONTACT SEAL WITH NON-STRAIGHT SPRING BEAM(S)

This invention was made with government support under Contract No. FA8626-16-C-2139 awarded by the United States Air Force. The government may have certain rights in the invention.

BACKGROUND OF THE INVENTION

1. Technical Field

This disclosure relates generally to rotational equipment and, more particularly, to a non-contact seal assembly for rotational equipment.

2. Background Information

Rotational equipment such as a gas turbine engine typically includes a seal assembly for sealing an annular gap between a rotor and a stationary structure. Various types and configurations of seal assemblies are known in the art. While these known seal assemblies have various advantages, there is still room in the art for improvement.

SUMMARY OF THE DISCLOSURE

According to an aspect of the present disclosure, an assembly is provided for rotational equipment. This assembly includes a plurality of seal shoes, a seal base and a plurality of spring elements. The seal shoes are arranged around an axis in an annular array. The seal shoes include a first seal shoe. The seal base circumscribes the annular array of the seal shoes. Each of the spring elements is radially between and connects a respective one of the seal shoes and the seal base. The spring elements include a first spring element. The first spring element includes a first mount, a second mount and a spring beam. The first mount is connected to the first seal shoe. The second mount is connected to the seal base and disposed a circumferential distance away from the first mount. The spring beam extends longitudinally along a non-straight centerline between and is connected to the first mount and the second mount.

According to another aspect of the present disclosure, another assembly is provided for rotational equipment. This assembly includes a non-contact seal assembly that includes a plurality of seal shoes, a seal base and a plurality of spring elements. The seal shoes are arranged around an axis and include a first seal shoe. The seal base circumscribes the seal shoes. Each of the spring elements is radially between and connects a respective one of the seal shoes and the seal base. The spring elements include a first spring element. The first spring element includes a first mount, a second mount and a spring beam. The first mount is connected to the first seal shoe. The second mount is connected to the seal base and disposed a circumferential distance away from the first mount. The spring beam extends longitudinally along a curved centerline between and is connected to the first mount and the second mount.

According to still another aspect of the present disclosure, another assembly is provided for rotational equipment. This assembly includes a non-contact seal assembly that includes a plurality of seal shoes, a seal base and a plurality of spring elements. The seal shoes are arranged around an axis and include a first seal shoe. The seal base circumscribes the seal shoes. Each of the spring elements is radially between and connects a respective one of the seal shoes to the seal base. The spring elements include a first spring element. The first spring element includes a first mount, a second mount and a spring beam. The first mount is connected to the first seal shoe. The second mount is connected to the seal base and is circumferentially separated from the first mount. The spring beam extends longitudinally between and is connected to the first mount and the second mount. The spring beam generally follows a curvature of the first seal shoe as the spring beam extends longitudinally between the first mount and the second mount.

The non-straight centerline may be a generally arcuate centerline.

The non-straight centerline may extend circumferentially about the axis.

The non-straight centerline may have a substantially constant radius to the axis as the spring beam extends longitudinally between the first mount and the second mount.

The non-straight centerline may have a variable radius to the axis as the spring beam extends longitudinally between the first mount and the second mount.

The spring beam may generally follow a curvature of the first seal shoe as the spring beam extends longitudinally between the first mount and the second mount.

The spring beam may extend longitudinally along a non-straight centerline between the first mount and the second mount.

The first spring element may further include a second spring beam extending longitudinally between and connected to the first mount and the second mount.

The second spring beam may extend along a non-straight centerline longitudinally between the first mount and the second mount.

The assembly may further include a ring structure and a secondary seal device. The ring structure may axially engage with the seal base. The secondary seal device may be mounted with the ring structure. The secondary seal device may be configured to substantially seal an annular gap between the ring structure and the annular array of the seal shoes.

The assembly may further include a stationary structure, a rotor structure and a seal assembly. The seal assembly may include the seal shoes, the seal base and the spring elements. The seal assembly may be configured to substantially seal an annular gap between the stationary structure and the rotor structure. The seal shoes may circumscribe and sealingly mate with the rotor structure. The seal base may be mounted to and radially within the stationary structure.

The stationary structure may be configured as or otherwise include a stationary structure of a gas turbine engine. The rotor structure may be configured as or otherwise include a turbine engine shaft assembly.

The assembly may further include a hydrostatic non-contact seal device which may include the seal shoes, the seal base and the spring elements.

The first spring element may further include a second spring beam extending longitudinally along a curved centerline between and connected to the first mount and the second mount.

The first spring element may further include a second spring beam extending longitudinally between and connected to the first mount and the second mount. The second spring beam may generally follow the curvature of the first seal shoe as the second spring beam extends longitudinally between the first mount and the second mount. The second

DETAILED DESCRIPTION OF THE INVENTION

Figure 1:
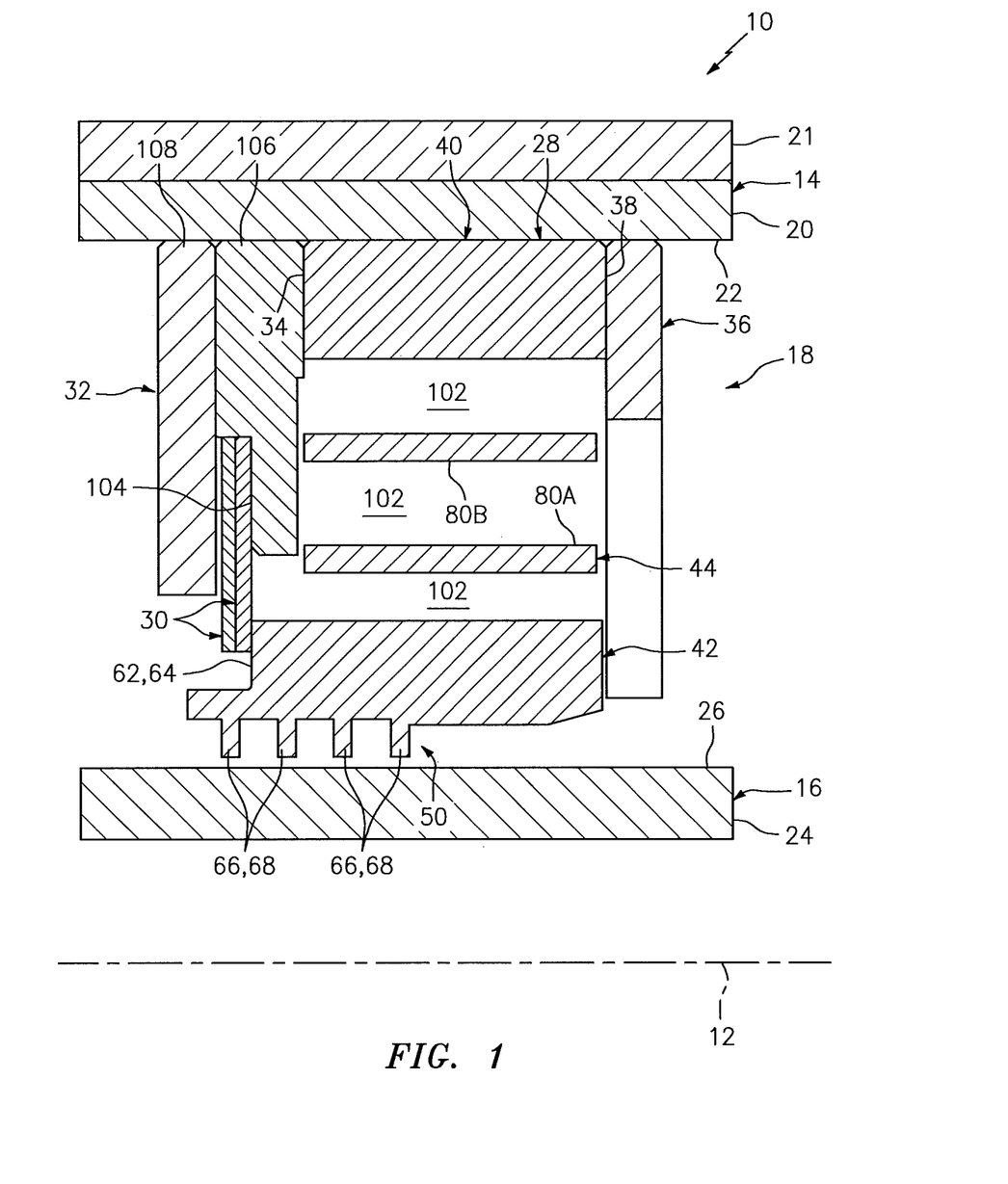
FIG. 1 is a partial side sectional illustration of an assembly for rotational equipment.

FIG. 1 illustrates an assembly 10 for rotational equipment with an axis 12 of rotation. An example of such rotational equipment is a gas turbine engine for an aircraft propulsion system, an exemplary embodiment of which is described below in further detail with respect to FIG. 9. However, the assembly 10 of the present disclosure is not limited to such an aircraft or gas turbine engine application. The assembly 10, for example, may alternatively be configured with rotational equipment such as an industrial gas turbine engine, a wind turbine, a water turbine or any other apparatus in which a seal is provided between a stationary structure and a rotor.

The assembly 10 of FIG. 1 includes a stationary structure 14, a rotor structure 16 and a non-contact seal assembly 18. The seal assembly 18 is mounted with the stationary structure 14 and configured to substantially seal an annular gap between the stationary structure 14 and the rotor structure 16 as described below in further detail.

The stationary structure 14 includes a seal carrier 20. This seal carrier 20 may be a discrete, unitary annular body and removably attached to another component 21 of the stationary structure 14. Alternatively, the seal carrier 20 may be configured with another component/portion of the stator structure; e.g., the components 20 and 21 may be integrally formed. The seal carrier 20 has an inner radial seal carrier surface 22. This seal carrier surface 22 may be substantially cylindrical, and extends circumferentially around and faces towards the axis 12. The seal carrier surface 22 at least partially forms a bore in the stationary structure 14. This bore is sized to receive the seal assembly 18, which seal assembly may be fixedly attached to the seal carrier 20 by, for example, a press fit connection between the seal assembly 18 and the seal carrier surface 22. The seal assembly 18, of course, may also or alternatively be fixedly attached to the seal carrier 20 using one or more other techniques/devices.

The rotor structure 16 includes a seal land 24. This seal land 24 may be a discrete, unitary annular body. Alternatively, the seal land 24 may be configured with another component/portion of the rotor structure 16. The seal land 24 has an outer radial seal land surface 26. This seal land surface 26 may be substantially cylindrical, and extends circumferentially around and faces away from the axis 12. The seal land surface 26 is disposed to face towards and is axially aligned with the seal carrier surface 22. While FIG. 1 illustrates the surfaces 26 and 22 with approximately equal axial lengths along the axis 12, the seal land surface 26 may alternatively be longer or shorter than the seal carrier surface 22 in other embodiments.

The seal assembly 18 includes a primary seal device 28 and one or more secondary seal devices 30. The seal assembly 18 also includes one or more additional components for positioning, supporting and/or mounting one or more of the seal devices with the stationary structure 14. The seal assembly 18 of FIG. 1, for example, includes a first ring structure 32 configured for positioning, supporting and/or mounting the secondary seal devices 30 relative to the primary seal device 28. This first ring structure 32 may also be configured for axially positioning and/or supporting a first end surface 34 of the primary seal device 28 relative to the stationary structure 14. The seal assembly 18 of FIG. 1 also includes a second ring structure 36 (e.g., a scalloped support ring/plate) configured for axially positioning and/or supporting a second end surface 38 of the primary seal device 28 relative to the stationary structure 14. However, the second ring structure 36 may be omitted where, for example, the second end surface 38 of the primary seal device 28 is abutted against another component/portion of the stationary structure 14 (e.g., an annular or castellated shoulder) or otherwise axially positioned/secured with the stationary structure 14.

Figure 2:
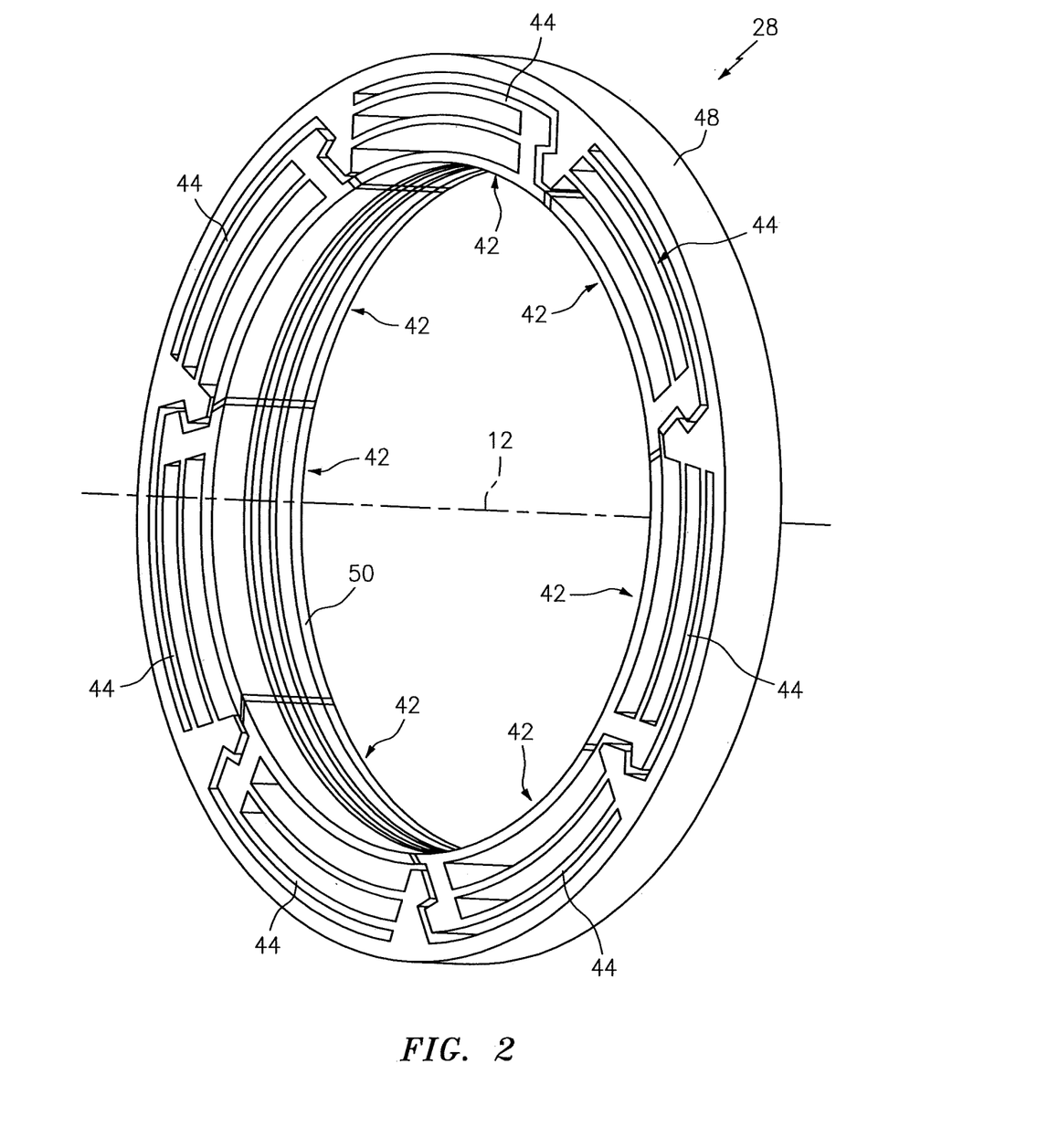
FIG. 2 is a perspective illustration of a primary seal device of a non-contact seal assembly.

Referring to FIG. 2, the primary seal device 28 is configured as an annular non-contact seal device and, more particularly, a hydrostatic non-contact seal device. An example of such a hydrostatic non-contact seal device is a HALO™ type seal; however, the primary seal device 28 of the present disclosure is not limited to the foregoing exemplary hydrostatic non-contact seal device type or configuration.

Figure 3:
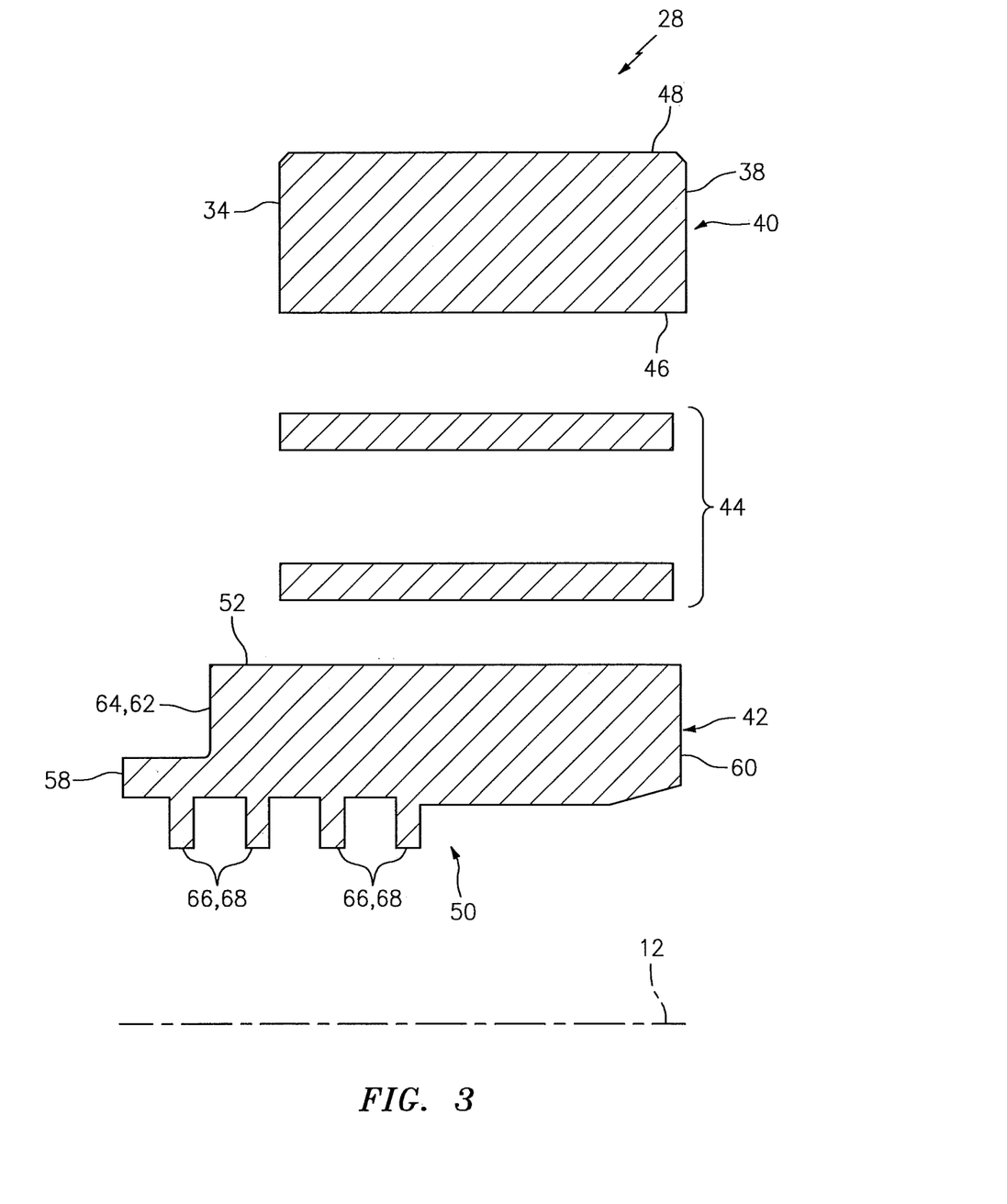
FIG. 3 is a partial side sectional illustration of the primary seal device.
Figure 4:
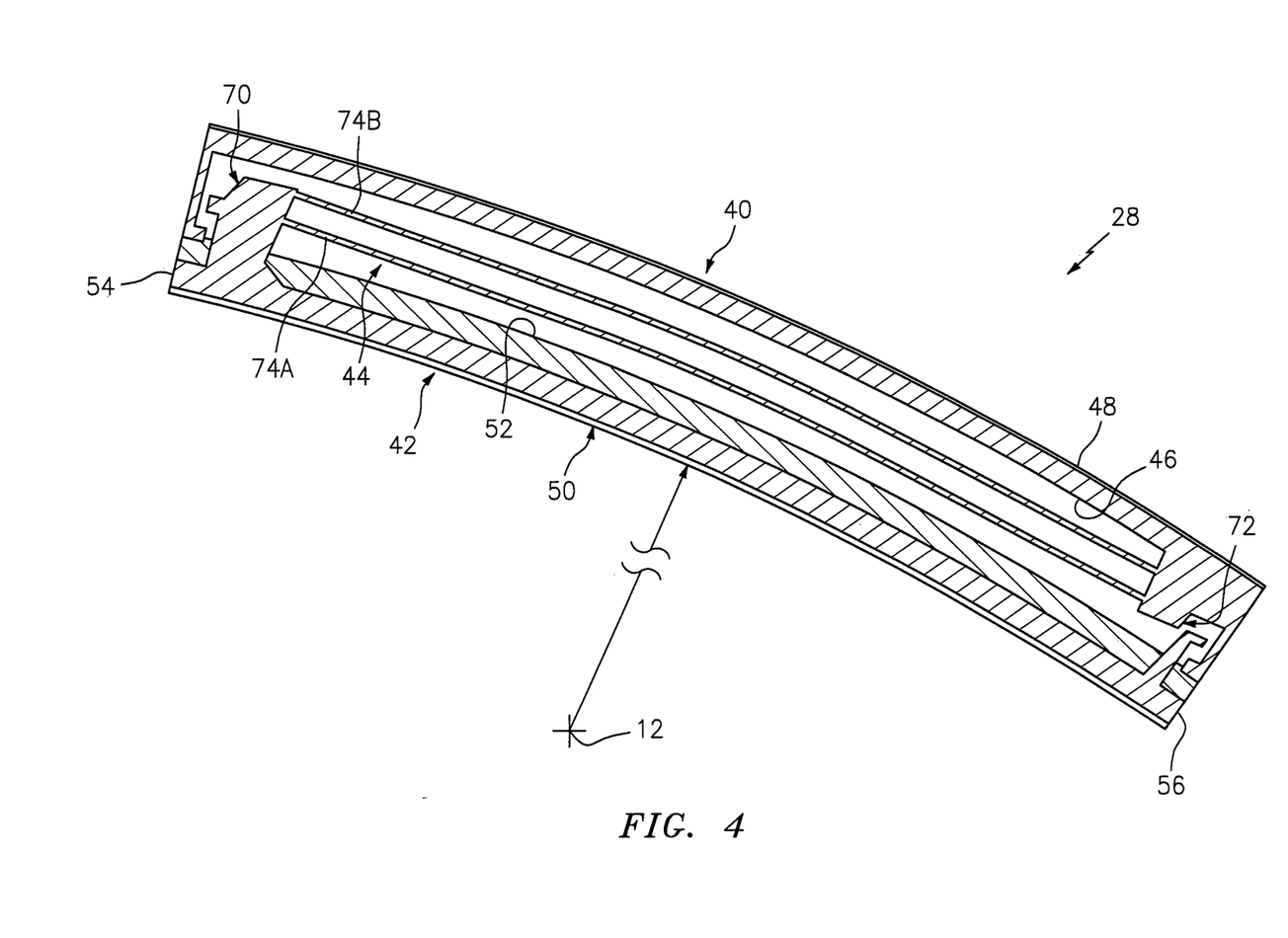
FIG. 4 is an end illustration of a section of the primary seal device.

Referring to FIGS. 3 and 4, the primary seal device 28 includes a seal base 40, a plurality of seal shoes 42 and a plurality of spring elements 44. The seal base 40 is configured as an annular full hoop body (see FIG. 2), which extends circumferentially around the axis 12. The seal base 40 is configured to circumscribe and support the seal shoes 42 as well as the spring elements 44. The seal base 40 extends axially along the axis 12 between and forms the first end surface 34 and the second end surface 38. The seal base 40 extends radially between an inner radial base side 46 and an outer radial base side 48. The outer radial base side 48 radially engages (e.g., is press fit against) the stationary structure 14 and, more particularly, the seal carrier surface 22 (see FIG. 1).

Referring to FIG. 2, the seal shoes 42 are configured as arcuate bodies and arranged circumferentially about the axis 12 in an annular array. This annular array of the seal shoes 42 extends circumferentially around the axis 12, thereby forming an inner bore at an inner radial side 50 of the primary seal device 28. As best seen in FIG. 1, the inner bore is sized to receive the seal land 24, where the rotor structure 16 projects axially through (or into) the inner bore formed by the seal shoes 42.

Referring to FIG. 4, each of the seal shoes 42 extends radially from the inner radial side 50 of the primary seal device 28 to an outer radial surface 52 of that seal shoe 42. Each of the seal shoes 42 extends circumferentially around the axis 12 between opposing first and second circumferential sides 54 and 56 of that seal shoe 42.

Referring to FIG. 3, each of the seal shoes 42 extends axially along the axis 12 between a first shoe end 58 and a second shoe end 60. The first shoe end 58 may be axially offset from and project axially away from the first end surface 34. The second shoe end 60 may be axially aligned with the second end surface 38. The seal shoes 42 of the present disclosure, however, are not limited to such exemplary relationships.

Each of the seal shoes 42 includes an arcuate end surface 62 generally at (e.g., on, adjacent or proximate) the first shoe end 58. In the array, these arcuate end surfaces 62 collectively form a generally annular (but circumferentially segmented) end surface 64 configured for sealingly engaging with the secondary seal devices 30; see FIG. 1. The seal shoes 42 of the present disclosure, however, are not limited to the foregoing exemplary configuration.

Each of the seal shoes 42 includes one or more arcuate protrusions 66, which collectively form one or more (e.g., a plurality of axially spaced) generally annular (e.g., circumferentially segmented) ribs 68 at the inner radial side 50. Distal inner radial ends of one or more of these ribs 68 are configured to be arranged in close proximity with (but not touch) and thereby sealingly mate with the seal land surface 26 in a non-contact manner (see FIG. 1), where the rotor structure 16 project axially through (or into) the inner bore formed by the seal shoes 42. In the embodiment of FIG. 3, each of the ribs 68 has the same radial height. In other embodiments, however, one or more of the ribs 68 may have a different radial height than at least another one of the ribs 68.

Referring to FIG. 2, the spring elements 44 are arranged circumferentially about the axis 12 in an annular array. Referring to FIGS. 3 and 4, the spring elements 44 are also arranged radially between the seal shoes 42 and the seal base 40. Each of the spring elements 44 is configured to moveably and resiliently connect a respective one of the seal shoes 42 to the seal base 40.

The spring element 44 of FIG. 4 includes first and second mounts 70 and 72 (e.g., generally radial fingers/projections) and one or more spring beams 74A and 74B (generally referred to as "74"). The first mount 70 is connected to a respective one of the seal shoes 42 at (e.g., on, adjacent or proximate) the first circumferential side 54, where the opposing second circumferential side 56 of that seal shoe 42 is free floating. The second mount 72 is connected to the seal base 40, and is generally circumferentially aligned with or near the second circumferential side 56. The second mount 72 therefore is separated from the first mount 70 by a circumferential distance.

The spring beams 74 are configured as resilient, biasing members of the primary seal device 28. The spring beams 74 of FIG. 4, for example, are generally configured as cantilevered-leaf springs. These spring beams 74 are radially stacked and spaced apart with one another so as to form a four bar linkage with the first mount 70 and the second mount 72. More particularly, each of the spring beams 74 is connected to the first mount 70 and the second mount 72. Each of the spring beams 74 has a centerline 80A, 80B (see FIGS. 5 and 7; generally referred to as "80") and extends longitudinally (e.g., in a generally circumferential direction relative to the axis 12) along that centerline 80 between and to the first mount 70 and the second mount 72. The spring beams 74 of FIG. 4 thereby laterally overlap a major circumferential portion (e.g., ~50-100%) of the respective seal shoe 42.

Figure 5:
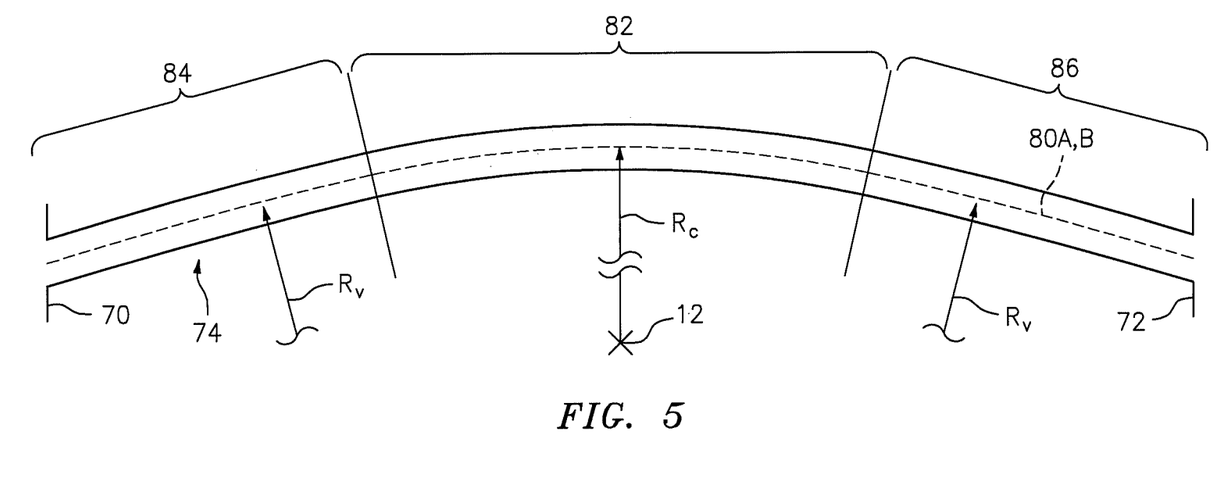
FIG. 5 is an end illustration of a spring beam extending between a pair of mounts.

Referring to FIG. 5, each centerline 80 is a non-straight centerline such as, but not limited to, a curved (e.g., arcuate) centerline. Examples of a curved centerline include, but are not limited to, a partially circular centerline, a partially oval centerline, a partially elliptical centerline and a curvilinear splined centerline.

Figure 6:
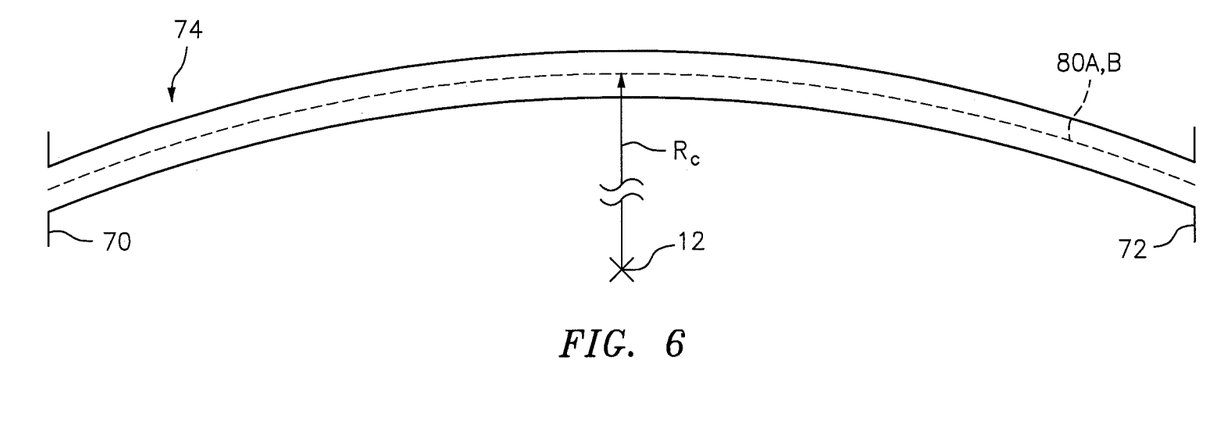
FIG. 6 is an end illustration of another spring beam extending between the mounts.

The centerline 80 of FIG. 5 has a variable radius R to the axis 12 as the spring beam 74 extends longitudinally between the first mount 70 and the second mount 72. For example, the spring beam 74 of FIG. 5 includes a curved center portion 82 with a substantially constant radius $R_c$ and opposing end portions 84 and 86 with radii $R_v$ (e.g., gradually increasing radii) that are different from the constant radius Re of the center portion 82. The end portions 84 and 86 may be generally straight end portions or curved end portions. The present disclosure, however, is not limited to the foregoing exemplary variable radius configuration. For example, in the embodiment of FIG. 6, the centerline 80 has a substantially constant radius $R_c$ as the spring beam 74 extends longitudinally between the first mount 70 and the second mount 72.

Figure 7:
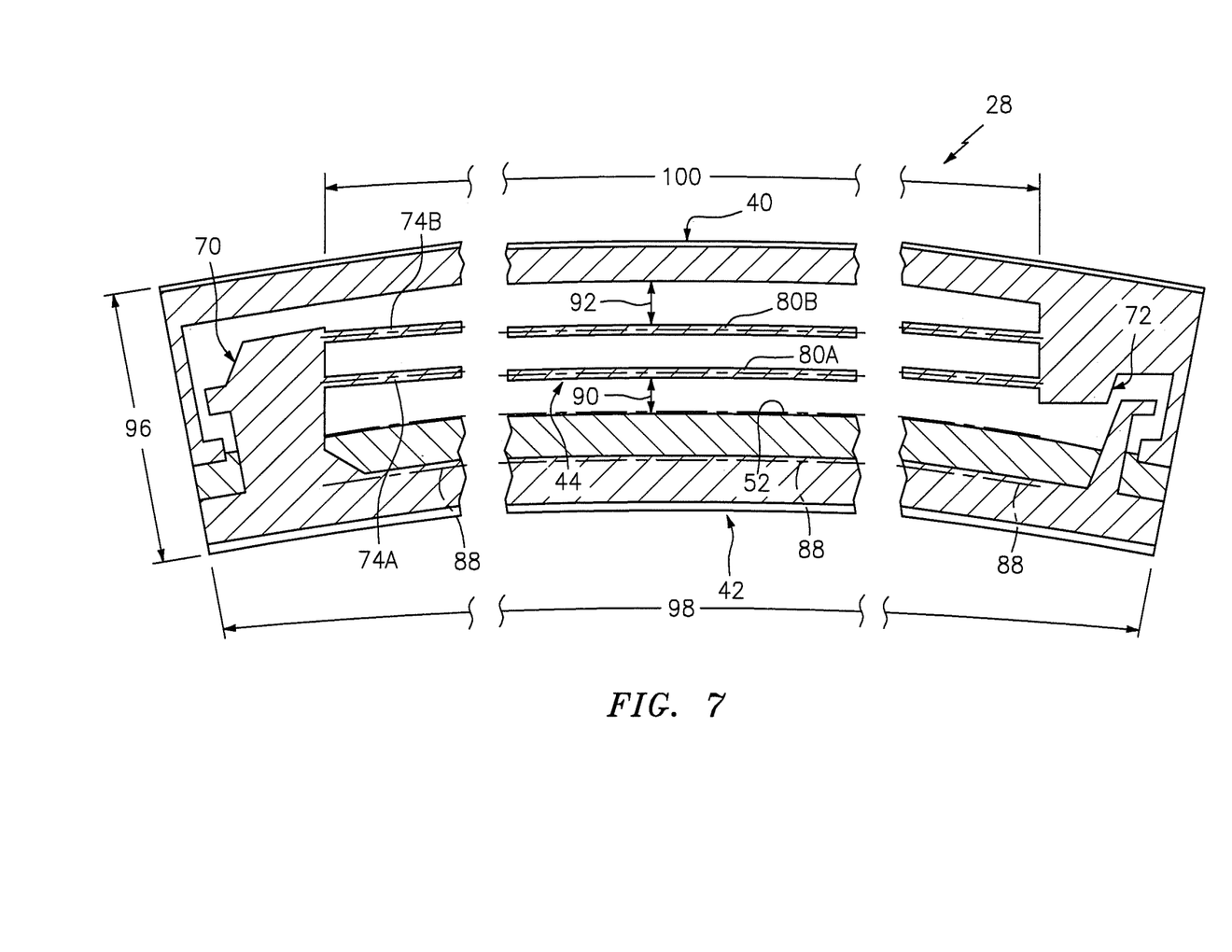
FIG. 7 is a segmented end illustration of the primary seal device section of FIG. 4.

Referring to FIG. 7, by providing the spring beams 74 with non-straight centerlines 80, the spring beams 74 may be configured to generally follow (e.g., proportionally match) a curvature of its respective seal shoe 42. For example, a curvature of each centerline 80 may generally follow a curvature of the outer radial surface 52 and/or a curvature of a centerline 88 of the respective seal shoe 42.

With this configuration, a radial height 90 of an airgap between the inner spring beam 74A and the seal shoe 42 may be substantially uniform as at least a major portion (e.g., more than 65%) of the spring beam 74A extends between the mounts 70 and 72. A radial height 92 of an airgap between the outer spring beam 74B and the seal base 40 may be substantially uniform as at least a major portion (e.g., more than 65%) of the spring beam 74B extends between the mounts 70 and 72.

Figure 8A:
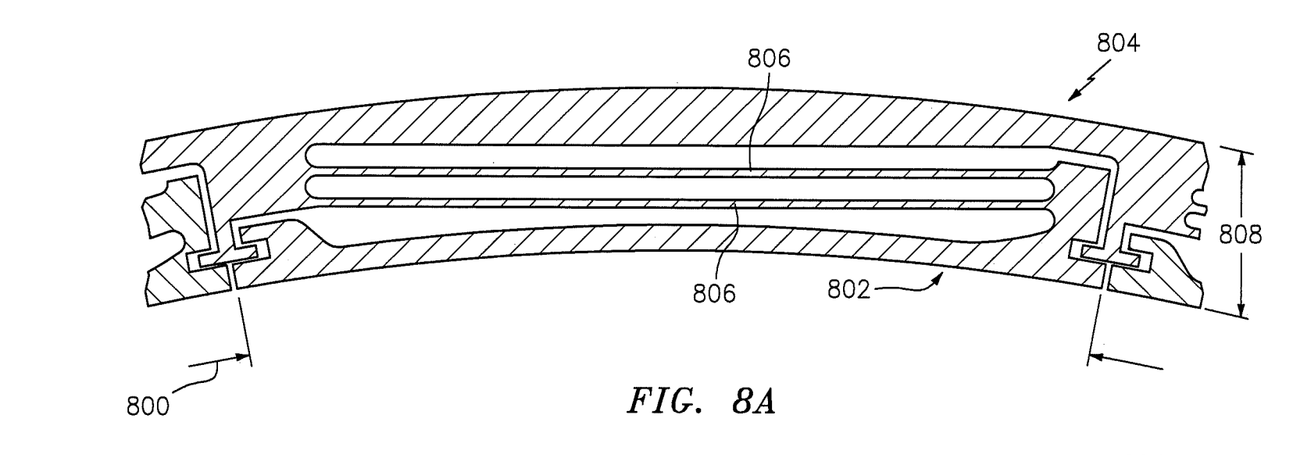
FIGS. 8A and 8B are illustration of alternative primary seal devices.
Figure 8B:
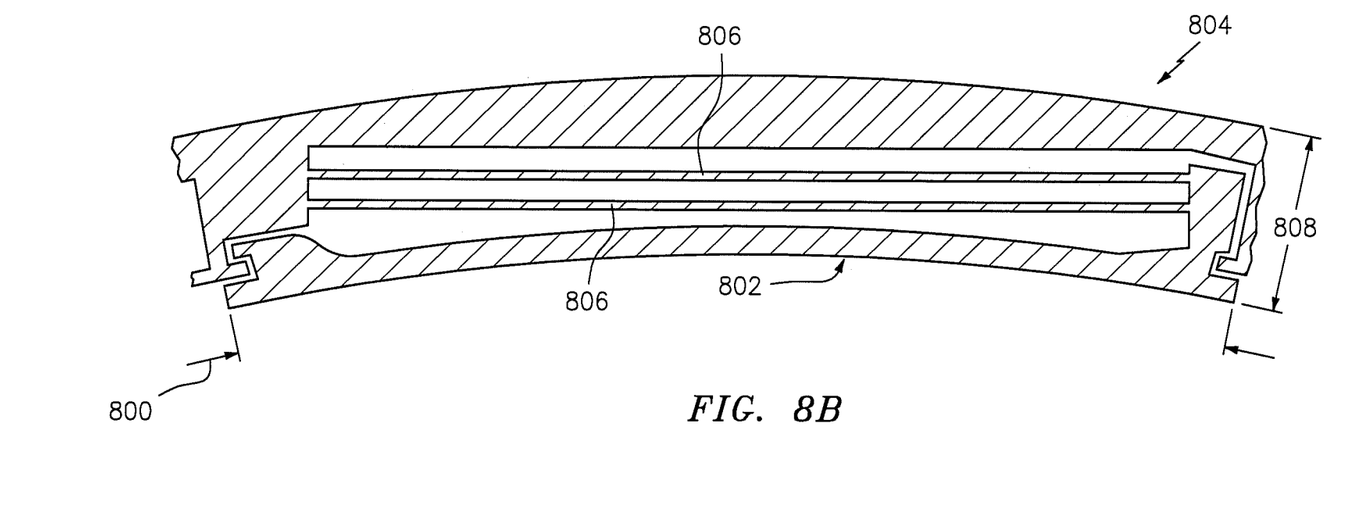

Maintaining substantially uniform radial heights 90, 92 and/or 94 of the airgaps as described above may enable an overall radial thickness 96 of the primary seal device 28 to be reduced while also enabling circumferential lengths 98 and 100 of the seal shoes 42 and/or the spring beams 74 to be increased. By contrast, as depicted by FIGS. 8A and 8B, increasing a length 800 of a seal shoe 802 in a seal device 804 with straight spring beams 806 also requires increasing an overall radial thickness 808 of the seal device 804 in order to maintain a minimum airgap between the seal device elements 802, 804 and 806. Such an increase in the overall radial thickness 808 may require increasing the size and weight of the entire piece of rotational equipment, or may prevent the seal device 804 from being used in the piece of rotational equipment.

Referring again to FIG. 7, increasing the lengths 98 and 100 of the seal shoes 42 and the spring beams 74 enables use of fewer seal shoes 42 in the primary seal device 28. Increasing the lengths 100 of the spring beams 74 also enables a decrease in spring beam stiffness as well as an increase in spring beam flexure. This may decrease internal spring beam operational stresses and, thereby, allow use of alternate (e.g., lower cost) materials to form the primary seal device 28.

Referring to FIG. 1, during operation of the primary seal device 28, rotation of the rotor structure 16 may develop aerodynamic forces and apply a fluid pressure to the seal shoes 42 causing each seal shoe 42 to respectively move radially relative to the seal land surface 26. The fluid velocity may increase as a gap between a respective seal shoe 42 and the seal land surface 26 increases, thus reducing pressure in the gap and drawing the seal shoe 42 radially inwardly toward the seal land surface 26. As the gap closes, the velocity may decrease and the pressure may increase within the gap, thus, forcing the seal shoe 42 radially outwardly from the seal land surface 26. The respective spring element 44 may deflect and move with the seal shoe 42 to create a primary seal of the gap between the seal land surface 26 and ribs 68 within predetermined design tolerances.

While the primary seal device 28 is operable to generally seal the annular gap between the stationary structure 14 and the rotor structure 16 as described above, fluid (e.g., gas) may still flow axially through passages 102 defined by the radial air gaps between the elements 42, 80A, 80B and 40. The secondary seal devices 30 therefore are provided to seal off these passages 102 and, thereby, further and more completely seal the annular gap.

Each of the secondary seal devices 30 may be configured as a ring seal element such as, but not limited to, a split ring. Alternatively, one or more of the secondary seal devices 30 may be configured as a full hoop body ring, an annular brush seal or any other suitable ring-type seal.

The secondary seal devices 30 of FIG. 1 are arranged together in an axial stack. In this stack, each of the secondary seal devices 30 axially engages (e.g., contacts) another adjacent one of the secondary seal devices 30. The stack of the secondary seal devices 30 is arranged with the first ring structure 32, which positions and mounts the secondary seal devices 30 with the stationary structure 14 adjacent the primary seal device 28. In this arrangement, the stack of the secondary seal devices 30 is operable to axially engage and form a seal between the end surface 64 of the array of the seal shoes 42 and an annular surface 104 of the first ring structure 32. These surfaces 64 and 104 are axially aligned with one another, which enables the stack of the secondary seal devices 30 to slide radially against, but maintain sealing engagement with, the end surface 64 as the seal shoes 42 move radially relative to the seal land surface 26 as described above.

The first ring structure 32 may include a secondary seal device support ring 106 and a retention ring 108. The support ring 106 is configured with an annular full hoop body, which extends circumferentially around the axis 12. The support ring 106 includes the annular surface 104, and is disposed axially adjacent and engaged with the seal base 40.

The retention ring 108 is configured with an annular full hoop body, which extends circumferentially around the axis 12. The retention ring 108 is disposed axially adjacent and engaged with the support ring 106, thereby capturing the stack of the secondary seal devices 30 within an annular channel formed between the rings 106 and 108. The stack of the secondary seal devices 30, of course, may also or alternatively be attached to one of the rings 106, 108 by, for example, a press fit connection and/or otherwise.

Figure 9:
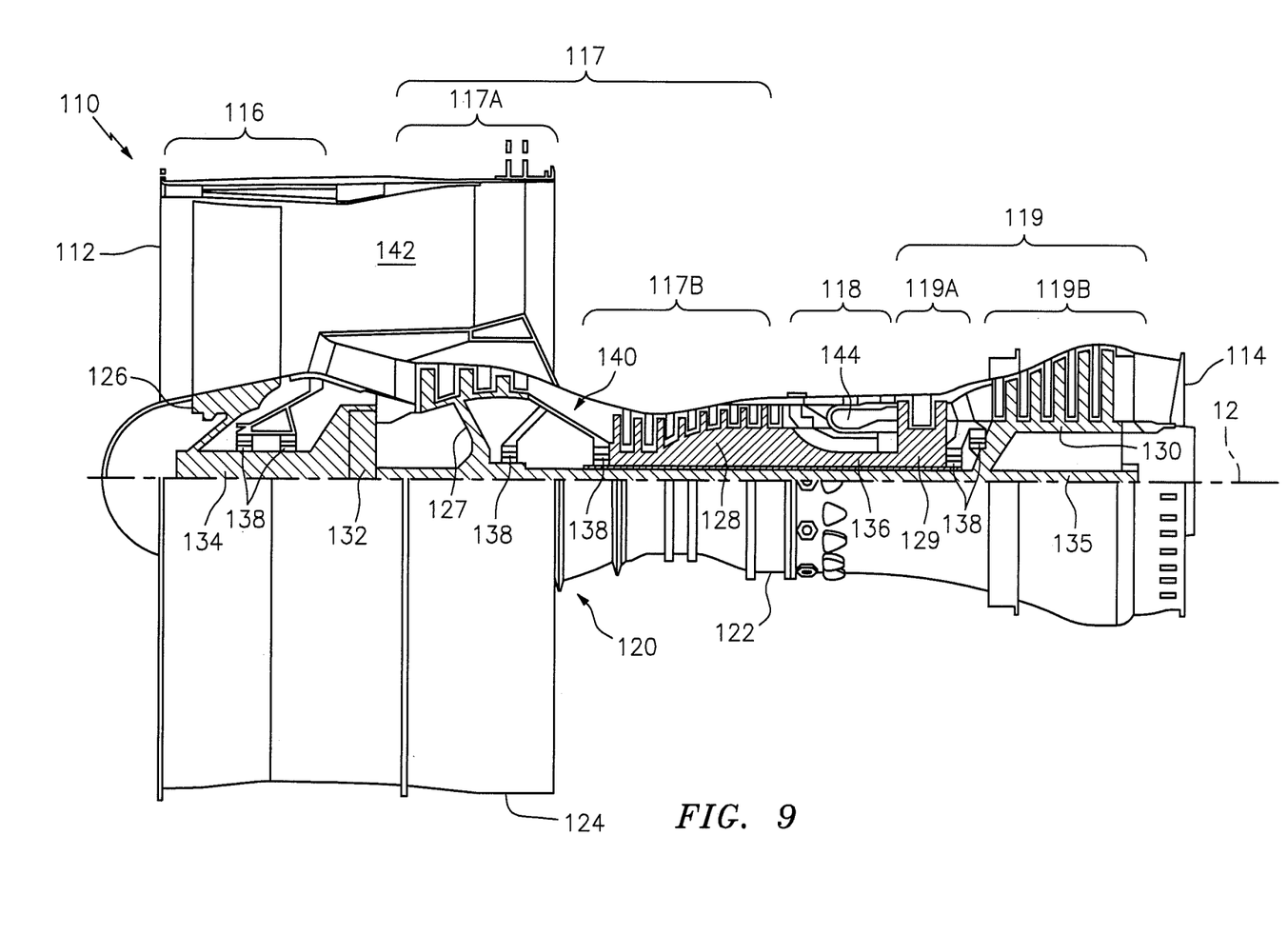
FIG. 9 is a side cutaway illustration of a geared gas turbine engine.

As described above, the assembly 10 of the present disclosure may be configured with various different types and configurations of rotational equipment. FIG. 9 illustrates one such type and configuration of the rotational equipment—a geared turbofan gas turbine engine 110. Such a turbine engine includes various stationary structures (e.g., bearing supports, hubs, cases, etc.) as well as various rotors (e.g., rotor disks, shafts, shaft assemblies, etc.) as described below, where the stationary structure 14 and the rotor structure 16 can respectively be configured as anyone of the foregoing structures in the turbine engine 110 of FIG. 9, or other structures not mentioned herein.

The turbine engine 110 of FIG. 9 extends along an axis (e.g., the axis 12 or rotation) between an upstream airflow inlet 112 and a downstream airflow exhaust 114. The turbine engine 110 includes a fan section 116, a compressor section 117, a combustor section 118 and a turbine section 119. The compressor section 117 includes a low pressure compressor (LPC) section 117A and a high pressure compressor (HPC) section 117B. The turbine section 119 includes a high pressure turbine (HPT) section 119A and a low pressure turbine (LPT) section 119B.

The engine sections 116-119 are arranged sequentially along the axis 12 within an engine housing 120. This housing 120 includes an inner case 122 (e.g., a core case) and an outer case 124 (e.g., a fan case). The inner case 122 may house one or more of the engine sections 117-119; e.g., an engine core. The outer case 124 may house at least the fan section 116.

Each of the engine sections 116, 117A, 117B, 119A and 119B includes a respective rotor 126-130. Each of these rotors 126-130 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 126 is connected to a gear train 132, for example, through a fan shaft 134. The gear train 132 and the LPC rotor 127 are connected to and driven by the LPT rotor 130 through a low speed shaft 135. The HPC rotor 128 is connected to and driven by the HPT rotor 129 through a high speed shaft 136. The shafts 134-136 are rotatably supported by a plurality of bearings 138. Each of these bearings 138 is connected to the engine housing 120 by at least one stationary structure such as, for example, an annular support strut.

During operation, air enters the turbine engine 110 through the airflow inlet 112. This air is directed through the fan section 116 and into a core gas path 140 and a bypass gas path 142. The core gas path 140 extends sequentially through the engine sections 117-119; e.g., an engine core. The air within the core gas path 140 may be referred to as "core air". The bypass gas path 142 extends through a bypass duct, which bypasses the engine core. The air within the bypass gas path 142 may be referred to as "bypass air".

The core air is compressed by the compressor rotors 127 and 128 and directed into a combustion chamber 144 of a combustor in the combustor section 118. Fuel is injected into the combustion chamber 144 and mixed with the compressed core air to provide a fuel-air mixture. This fuel air mixture is ignited and combustion products thereof flow through and sequentially cause the turbine rotors 129 and 130 to rotate. The rotation of the turbine rotors 129 and 130 respectively drive rotation of the compressor rotors 128 and 127 and, thus, compression of the air received from a core airflow inlet. The rotation of the turbine rotor 130 also drives rotation of the fan rotor 126, which propels bypass air through and out of the bypass gas path 142. The propulsion of the bypass air may account for a majority of thrust generated by the turbine engine 110, e.g., more than seventy-five percent (75%) of engine thrust. The turbine engine 110 of the present disclosure, however, is not limited to the foregoing exemplary thrust ratio.

The assembly 10 may be included in various aircraft and industrial turbine engines other than the one described above as well as in other types of rotational equipment; e.g., wind turbines, water turbines, rotary engines, etc. The assembly 10, for example, may be included in a geared turbine engine where a gear train connects one or more shafts to one or more rotors in a fan section, a compressor section and/or any other engine section. Alternatively, the assembly 10 may be included in a turbine engine configured without a gear train. The assembly 10 may be included in a geared or non-geared turbine engine configured with a single spool, with two spools (e.g., see FIG. 9), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for rotational equipment, comprising:
a plurality of seal shoes arranged around an axis in an annular array, the seal shoes comprising a first seal shoe;
a seal base circumscribing the annular array of the seal shoes; and
a plurality of spring elements, each of the spring elements radially between and connecting a respective one of the seal shoes and the seal base, the spring elements comprising a first spring element that includes:
a first mount connected to the first seal shoe;
a second mount connected to the seal base and disposed a circumferential distance away from the first mount; and
a spring beam having a non-straight centerline, the spring beam extending longitudinally along the non-straight centerline between and connected to the first mount and the second mount.

2. The assembly of claim 1, wherein the non-straight centerline is a generally arcuate centerline.

3. The assembly of claim 1, wherein the non-straight centerline extends circumferentially about the axis.

4. The assembly of claim 1, wherein the non-straight centerline has a constant radius to the axis as the spring beam extends longitudinally between the first mount and the second mount.

5. The assembly of claim 1, wherein
the non-straight centerline has a variable radius to the axis as the spring beam extends longitudinally between the first mount and the second mount; and
the spring beam includes a curved center portion with a substantially constant radius and opposing end portions with variable radii that are different from the constant radius of the center portion.

6. The assembly of claim 1, wherein the spring beam generally follows a curvature of the first seal shoe as the spring beam extends longitudinally between the first mount and the second mount.

7. The assembly of claim 1, wherein the first spring element further includes a second spring beam extending longitudinally between and connected to the first mount and the second mount.

8. The assembly of claim 7, wherein
the second spring beam has a second non-straight centerline; and
the second spring beam extends along the second non-straight centerline longitudinally between the first mount and the second mount.

9. The assembly of claim 1, further comprising:
a ring structure axially engaged with the seal base; and
a secondary seal device mounted with the ring structure, the secondary seal device configured to seal an annular gap between the ring structure and the annular array of the seal shoes.

10. The assembly of claim 1, further comprising:
a stationary structure;
a rotor structure; and
a seal assembly comprising the seal shoes, the seal base and the spring elements, the seal assembly configured to seal an annular gap between the stationary structure and the rotor structure;
wherein the seal shoes circumscribe and sealingly mate with the rotor structure; and
wherein the seal base is mounted to and radially within the stationary structure.

11. The assembly of claim 1, wherein the stationary structure comprises a stationary structure of a gas turbine engine, and the rotor structure comprises a turbine engine shaft assembly.

12. The assembly of claim 1, further comprising a hydrostatic non-contact seal device that includes the seal shoes, the seal base and the spring elements.

13. An assembly for rotational equipment, comprising:
a non-contact seal assembly comprising a plurality of seal shoes, a seal base and a plurality of spring elements;
the seal shoes arranged around an axis and comprising a first seal shoe;
the seal base circumscribing the seal shoes;
each of the spring elements radially between and connecting a respective one of the seal shoes and the seal base; and
the spring elements comprising a first spring element that includes
a first mount connected to the first seal shoe;
a second mount connected to the seal base and disposed a circumferential distance from the first mount; and
a spring beam having a curved centerline, the spring beam extending longitudinally along the curved centerline between and connected to the first mount and the second mount.

14. The assembly of claim 13, wherein the spring beam generally follows a curvature of the first seal shoe as the spring beam extends longitudinally between the first mount and the second mount.

15. The assembly of claim 13, wherein
the first spring element further includes a second spring beam that has a second curved centerline; and
the second spring beam extends longitudinally along the second curved centerline between and is connected to the first mount and the second mount.

16. The assembly of claim 13, further comprising:
a ring structure axially engaged with the seal base; and
a secondary seal device mounted with the ring structure, the secondary seal device configured to seal an annular gap between the ring structure and the annular array of the seal shoes.

17. An assembly for rotational equipment, comprising:
a non-contact seal assembly comprising a plurality of seal shoes, a seal base and a plurality of spring elements;

the seal shoes arranged around an axis and comprising a first seal shoe;

the seal base circumscribing the seal shoes;

each of the spring elements radially between and connecting a respective one of the seal shoes and the seal base; and the spring elements comprising a first spring element that includes
- a first mount connected to the first seal shoe;
- a second mount connected to the seal base and circumferentially separated from the first mount; and
- a spring beam extending longitudinally between and connected to the first mount and the second mount, wherein the spring beam has a non-straight centerline such that the spring beam generally follows a curvature of the first seal shoe as the spring beam extends longitudinally between the first mount and the second mount.

18. The assembly of claim 17, wherein the first spring element further includes a second spring beam extending longitudinally between and connected to the first mount and the second mount; and the second spring beam generally follows the curvature of the first seal shoe as the second spring beam extends longitudinally between the first mount and the second mount.

19. The assembly of claim 17, further comprising:

a ring structure axially engaged with the seal base; and a secondary seal device mounted with the ring structure, the secondary seal device configured to seal an annular gap between the ring structure and the annular array of the seal shoes.

20. The assembly of claim 17, wherein the non-straight centerline has a variable radius to the axis as the spring beam extends longitudinally between the first mount and the second mount; and the spring beam includes a curved center portion with a substantially constant radius and opposing end portions with variable radii that are different from the constant radius of the center portion.

\* \* \* \* \*